United States Patent
Okuyama et al.

(10) Patent No.: US 8,652,358 B2
(45) Date of Patent: Feb. 18, 2014

(54) ALUMINUM OXIDE PHOSPHOR AND METHOD FOR PRODUCING THE SAME

(75) Inventors: Kikuo Okuyama, Higashi-hiroshima (JP); Ferry Iskandar, Higashi-hiroshima (JP); Yutaka Kaihatsu, Higashi-hiroshima (JP); Jun Takai, Kurashiki (JP); Hideharu Iwasaki, Kurashiki (JP)

(73) Assignees: Hiroshima University, Higashi-Hiroshima-shi (JP); Kuraray Co., Ltd., Kurashiki-shi (JP)

( * ) Notice: Subject to any disclaimer, the term of this patent is extended or adjusted under 35 U.S.C. 154(b) by 0 days.

(21) Appl. No.: 13/262,388

(22) PCT Filed: Mar. 31, 2010

(86) PCT No.: PCT/JP2010/055807
§ 371 (c)(1),
(2), (4) Date: Sep. 30, 2011

(87) PCT Pub. No.: WO2010/114002
PCT Pub. Date: Oct. 7, 2010

(65) Prior Publication Data
US 2012/0018675 A1    Jan. 26, 2012

(30) Foreign Application Priority Data
Apr. 1, 2009  (JP) ................... 2009-088608

(51) Int. Cl.
*C09K 11/08* (2006.01)
*C09K 11/66* (2006.01)
(52) U.S. Cl.
USPC .............................. 252/301.4 F; 252/301.4 R
(58) Field of Classification Search
USPC ............... 252/301.4 R, 301.4 F; 423/625; 250/484.5
See application file for complete search history.

(56) References Cited

U.S. PATENT DOCUMENTS 3,021,285 A * 2/1962 Bovarnick et al. ..... 252/301.4 R
3,541,377 A   11/1970 Nagy
(Continued)

FOREIGN PATENT DOCUMENTS

DE        226 899 A1    9/1985
JP        2008-520523   6/2008
(Continued)

OTHER PUBLICATIONS

Guduru et al., "Investigation into the possibility of using aluminum oxide dosimeter together with opically stimulated luminescence for accurate dose estimation in electron and photon fields used in radiotherapy", Jul. 2007, Graduate College of the Oklahoma State University, pp. 1 and 11-13.*

(Continued)

*Primary Examiner* — Emily Le
*Assistant Examiner* — Lynne Edmondson
(74) *Attorney, Agent, or Firm* — Oblon, Spivak, McClelland, Maier & Neustadt, L.L.P.

(57) ABSTRACT

The present invention provides an Al—C—O based phosphor using neither heavy metal nor rare metal and composed of elements with high environmental compatibility and excellent economic efficiency, wherein the wavelength of the peak intensity of the emission spectrum can be changed without changing the basic composition. An aluminum oxide phosphor which comprises aluminum (Al), carbon (C), and oxygen (O) respectively in an amount of 30 mol %<Al<60 mol %, 0 mol %<C<10 mol %, 30 mol %<O<70 mol % is provided. The above problem is solved in the production of an Al—C—O phosphor comprising aluminum (Al), carbon (C), and oxygen (O) by heating and firing a mixture comprising an aluminum-containing compound and a coordinatable oxygen-containing compound.

5 Claims, 3 Drawing Sheets

Diffraction angle 2θ(°)

(56) References Cited

U.S. PATENT DOCUMENTS

| | | |
|---|---|---|
| 6,414,324 B1 | 7/2002 | Colyott et al. |
| 7,182,929 B1 * | 2/2007 | Singhal et al. ............ 423/592.1 |
| 2002/0132135 A1 | 9/2002 | Sturley |
| 2008/0191600 A1 | 8/2008 | Misawa et al. |
| 2009/0140204 A1 * | 6/2009 | Le-Mercier ............ 252/301.6 R |
| 2010/0109508 A1 * | 5/2010 | Okuyama et al. ............ 313/486 |
| 2011/0260108 A1 * | 10/2011 | Takai et al. ............ 252/301.4 R |

FOREIGN PATENT DOCUMENTS

| | | |
|---|---|---|
| JP | 2009-19213 | 1/2009 |
| WO | WO 2006/098032 A1 | 9/2006 |
| WO | WO2008126500 A1 * | 10/2008 |

OTHER PUBLICATIONS

Yang et al.,'Influence of carbon on the thermoluminescence and optically stimulated luminescence of alpha-Al2O3:C crystals', Dec. 2008, Journal of Applied Physics, 104, pp. 123112-1 to 123112-6.*

EIC search report Sep. 18, 2013.*

Extended Search Report issued Aug. 16, 2012 in European Application No. 10758773.5.

Srinivas R. Bakshi, et al., "Thermal Conductivity of Plasma-Sprayed Aluminum Oxide-Multiwalled Carbon Nanotube Composites", J. Am. Ceram. Soc., vol. 91 No. 3, 2008, pp. 942-947.

* cited by examiner

ALUMINUM OXIDE PHOSPHOR AND METHOD FOR PRODUCING THE SAME

TECHNICAL FIELD

The present invention relates to an aluminum oxide phosphor which is useful as an electronic material, or a fluorescent material, and a method for producing the same.

BACKGROUND ART

Phosphors are used in fluorescent tubes, fluorescent display tubes, luminous display panels and other applications, and those usages are expanding. Additional recent trends include attempts to combine the phosphor with LED for use in various display devices such as a TV monitor as well as an advance in the research and development relating to white phosphor, which holds promises for a wide range of use.

Turning to fluorescent materials including those of natural substances, they exist in various organic and inorganic forms, and research and development efforts are made by working with different materials to improve a desired luminescent color, spectral intensity at peak emission, and economic efficiency. Specifically, research and development efforts are made in relation to SiALON based phosphor and aluminum oxide based phosphor.

Concerning the SiALON based phosphor, Patent Document 1 discloses a β-SiALON phosphor comprising a luminescence center element including Mn, Ce, Pr, Nd, Sm, Eu, Tb, Dy, Ho, Er, Tm or Yb.

Concerning the aluminum oxide based phosphor, Patent Document 2 discloses a green phosphor having a β-alumina structure, wherein the composition of the fluorescent layer is represented by the general formula $A(Zn_{1-x-y}Mg_xMn_y)Al_{10}O_{17}$ (wherein A is an element selected from Ca, Ba and Sr, x is a number satisfying $0.01 \leq x \leq 0.3$, and y is a number satisfying $0.02 \leq x \leq 0.14$).

Patent Document 3 discloses an alkaline-earth aluminate based phosphor which is at least partially crystallized in a β-alumina form. More specifically, it discloses a compound phosphor having a composition corresponding to the following formula: $a(M_1O).b(MgO).c(Al_2O_3)$ (1) (wherein, $M_1$ denotes at least one of alkaline-earth metal elements, a, b and c are independently an integer or non-integer satisfying the relationship of $0.25 \leq a \leq 4$; $0 \leq b \leq 2$ and $0.5 \leq c \leq 9$), wherein $M_1$ is partially substituted by europium and at least one other element selected from rare earth elements having an ionic radius smaller than that of $Eu^{3+}$, and wherein the compound is substantially in the form of a full particle with an average size of 6 μm or less.

CITATION LIST

Patent Documents

Patent Document 1: JP 2009-19213 A
Patent Document 2: WO 2006/098032 A1
Patent Document 3: JP 2008-520523 A

SUMMARY OF INVENTION

Technical Problem

As described in Patent Documents 1 and 3, conventional phosphors require rare metals such as rare earth elements, which act as the luminescence center element, and the use of rare metals is not favorable in view of the recent increase in price of natural resources or of resource conservation. Additionally, the phosphors of Patent Documents 1 and 2 require thermal processing at high temperatures for their production and thus necessitate the use of special reactors. Moreover, they have complex compositions, which disadvantageously lead to difficulties in emission wavelength adjustments.

Further, according to the conventional art described in the specifications of Patent Documents 1 and 2, changes in the wavelength of the emission spectrum are brought about by changing the basic composition of the phosphor or changing the activating agent which supplies the luminescence center element to the phosphor; in other words, to change the wavelength of the emission spectrum, phosphors having different compositions must be provided. Thus, the production of luminescent substances that exhibit required wavelengths has a problem that it requires various production processes and devices to be in place.

In view of such problems with the conventional art, it is an object of the present invention to provide a phosphor that is composed of elements with high environmental compatibility and excellent economic efficiency and free from heavy metals and rare metals, whereby the wavelength of the emission spectrum is variable without changing the basic composition of the phosphor.

Solution to Problem

The aluminum oxide phosphor according to the present invention and the production method of the same are described below.

[1] An aluminum oxide phosphor comprising aluminum (Al), carbon (C), and oxygen (O), wherein the elements are respectively contained in an amount of 30 mol %<Al<60 mol %, 0 mol %<C<10 mol %, 30 mol %<O<70 mol %.
[2] The aluminum oxide phosphor according to [1] wherein the aluminum oxide phosphor comprises a $\gamma\text{-}Al_2O_3$ structure.
[3] A method for producing the aluminum oxide phosphor according to [1] or [2] comprising the steps of:
  mixing an aluminum-containing compound with a coordinatable oxygen-containing organic compound; and
  firing the resulting mixture in the presence of oxygen.

Advantageous Effect of Invention

According to the present invention, it becomes possible to provide a phosphor that is composed of elements with high environmental compatibility and excellent economic efficiency and free from heavy metals and rare metals, whereby the wavelength of the emission spectrum of the phosphor is variable in the range between 350 nm (falling in the ultraviolet range) and 480 nm (corresponding to a green light) without changing the basic composition of the phosphor.

DESCRIPTION OF EMBODIMENT

Figure 1:
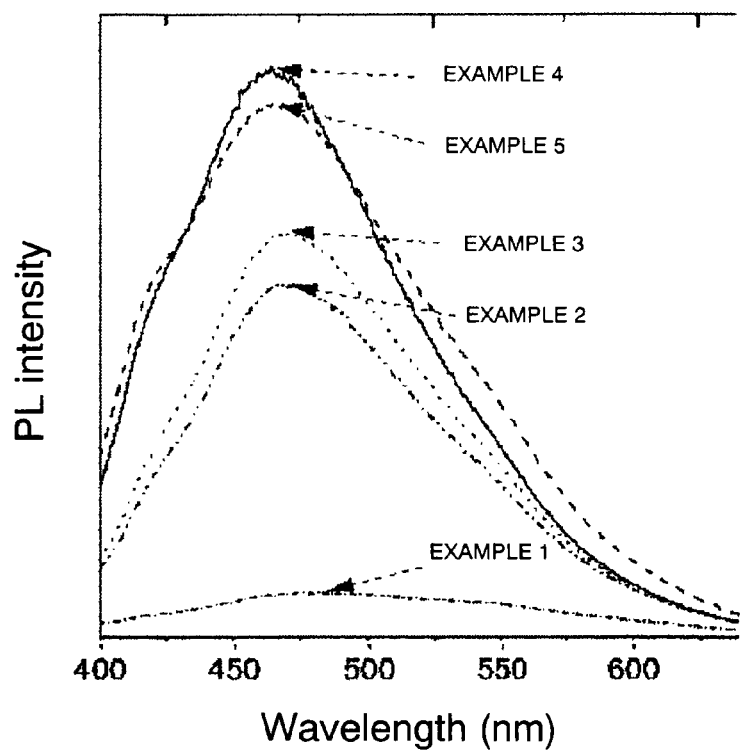
FIG. 1 is a graph showing the emission spectra under ultraviolet excitation of phosphors according to embodiments in the present invention.

Embodiments for carrying out the present invention is explained below.

The aluminum oxide phosphor according to the present invention comprises aluminum (Al), carbon (C), and oxygen (O), wherein the elements are respectively contained in an amount of 30 mol %<Al<60 mol %, 0 mol %<C<10 mol %, 30 mol %<O<70 mol %. The phrase "comprises aluminum (Al), carbon (C), and oxygen (O)" means that the constituents of the phosphor of the present invention is aluminum, carbon and oxygen, and it also means that other components that do not affect the luminescence property of the phosphor may be comprised therein. Such other components include impurities that are mixed in during the production processes or a trace amount of component that is normally accepted in the field of the art. The composition of the above phosphor is preferably 34 to 53 mol % of aluminum, 0.5 to 7 mol % of carbon, and 45 to 65 mol % of oxygen in view of the benefit of compound stability.

The aluminum oxide phosphor according to the present invention can be obtained by mixing an aluminum-containing compound and a coordinatable oxygen-containing organic compound together, and firing the resulting mixture. The aluminum-containing compound used in the present invention is not particularly limited, and various aluminum salts can be used. Such salts include mineral acid salts such as aluminum sulfate, aluminum nitrate, and aluminum phosphate; halides such as aluminum chloride, aluminum bromide, and aluminum iodide; organic acid salts such as aluminum acetate, and aluminum butyrate. In view of the efficiency in producing aluminum oxide phosphor as well as the availability and stability of raw materials, it is preferable to use aluminum sulfate, aluminum nitrate, and aluminum chloride. These salts can be used in the form of anhydrides or hydrates, but hydrates may be preferably used in view of excellent stability and also in view of the fact that water is suitable as a solvent for the reasons explained below.

The coordinatable oxygen-containing organic compound to be used in the present invention is not particularly limited. The coordinatable oxygen-containing organic compound is considered to contribute to formation of oxygen defects in phosphors. When the coordinatable oxygen-containing organic compound reacts with an aluminum compound, it supplies an oxygen atom as an oxygen source and also a carbon atom as a carbon source. When a solvent is used, the coordinatable oxygen-containing organic compound can act as a dispersing agent that improves the dispersion of the solutes and inhibits preferential deposition of only aluminum compound during evaporation of the solvent to facilitate the reaction between the aluminum-containing compound and the coordinatable oxygen-containing organic compound.

The coordinatable oxygen-containing organic compound to be used is not particularly limited, but a compound that can form a coordinate bond with aluminum is preferable. Examples of such compounds include polyethers such as polyethylene glycol (PEG), polyethylene glycol dimethyl ether, polyethylene oxide; polymeric compounds including hydroxy-group-containing polymers such as polyvinyl glycerin, and polyvinyl alcohol; polyhydric alcohols such as ethylene glycol, 1,2-propanediol, 1,3-propanediol, 1,2-butanediol, 1,4-butanediol, glycerin, diethylene glycol, triethylene glycol, tetraethylene glycol; and ethers such as dimethoxyethane, 1,2-propanediol dimethyl ether, 1,3-propanediol dimethyl ether, 1,2-butanediol dimethyl ether, 1,4-butanediol dimethyl ether, glycerin trimethyl ether, diethyleneglycol dimethyl ether, triethylene glycol dimethyl ether, tetraethylene glycol dimethyl ether, diethoxyethane, 1,2-propanediol diethyl ether, 1,3-propanediol diethyl ether, 1,2-butanediol diethyl ether, 1,4-butanediol diethyl ether, glycerin triethyl ether, diethylene glycol diethyl ether, triethylene glycol diethyl ether, tetraethylene glycol diethyl ether, and tetraethylene glycol diethyl ether. These compounds can be used alone, or in a combination of multiple compounds. Polymeric compounds such as polyethylene glycol, and polyhydric alcohols such as ethylene glycol or glycerin may be preferably used in view of availability, carbon-introducing effects and other considerations.

Dispersants may be present in the above reaction system, according to the present invention. The dispersant exhibits original dispersing effect and additionally acts to promote the coordinatable oxygen-containing organic compound to function as a dispersant, so that the coordinatable oxygen-containing organic compound is more likely to cause formation of oxygen defects in the phosphor. Examples of dispersants include urea derivatives such as urea and melamine; polyamides such as polyvinyl pyrrolidone; carbonates such as dimethyl carbonate, dibutyl carbonate, diphenyl carbonate, and polycarbonate; esters such as ethylene glycol diacetate, ethylene glycol dipropionate, butanediol diacetate, and butanediol dipropionate; polyesters such as polyethylene terephthalate, and polybutylene terephthalate; lactams such as N-methyl pyrrolidone.

Further, in the present invention, the mixture of the aluminum-containing compound and the coordinatable oxygen-containing organic compound mentioned above is dissolved or suspended in a solvent, and the obtained solution or suspension can be heated and fired. The solvent is not particularly limited as long as aluminum-containing compounds and coordinatable oxygen-containing organic compounds can be dissolved or dispersed in the solvent. Specifically, the solvent to be used includes water; alcohols such as methanol and ethanol; and ethers such as tetrahydrofuran, tetrahydropyran, and 1,4-dioxane. Water may be preferably used in view of safety in use and explosiveness.

It is important that the solvent to be used is free of impurity. If the solvent contains an alkali metal or an alkaline-earth metal, there is a concern that such a metal is reacted with an aluminum-containing compound to change the compound structure and affect its luminescence. Additionally, if the solvent contains a heavy metal, there is a concern that such a metal also affects the structural formation of aluminum oxide phosphor. Inclusion of halogen or other similar elements is not favorable because it accelerates the decomposition of oxygen-containing compounds, and inhibits carbon from being introduced into aluminum oxide phosphors. Accordingly, the total content of such impurity elements is preferably 5000 ppm or less, and more preferably 1000 ppm or less.

The amount each of the aluminum-containing compound and the coordinatable oxygen-containing organic compound to be used cannot be determined by a uniform rule because it is affected by conditions such as types of compounds used, firing temperature and time. However, the amount of the coordinatable oxygen-containing organic compound to be used is typically in the range of 10 to 1500 weight parts to 100 weight parts of the aluminum-containing compound, and more preferably, in the range of 50 to 1200 weight parts.

When a solvent is used, the amount of the solvent is not particularly limited; the amount cannot be determined by a uniform rule because it is affected by conditions such as types of compounds used, firing temperature and time. Typically, the amount of the solvent to be used is in the range of 1 to 50000 weight parts to 100 weight parts of the aluminum-containing compound, and preferably, in the range of 1 to 10000 weight parts. Use of an excessively large amount of the solvent necessitates increased time and heat quantity for removing the solvent, and accordingly is not economically efficient. The solvent is preferably used in an amount in the range of 1 to 5000 weight parts.

The following mixing process can be used to obtain a homogenized mixture from a mixture comprising the above-described aluminum-containing compound and coordinatable oxygen-containing compound or from a solution or suspension thereof, which is prepared by adding a solvent to the mixture. Specifically, the process for mixing solids may involve use of a ball mill, a turbo mill, or a jet mill, or alternatively a tool like a mortar. The process for mixing a solution or suspension may involve use of a hot plate stirrer, a magnetic stirrer, or an ultrasonic agitator. At first, before carrying out the latter mixing process, the solvent may be distilled away from the solution or suspension by spray-drying or any similar processes.

In the present invention, the mixture obtained by the above processes are fired. Various firing techniques may be used for the firing process, as long as they can bring about the thermal decomposition of the coordinatable oxygen-containing organic compound in the above mixture or in a solution comprising the mixture. The firing techniques may involve use of a heating-firing furnace with a moving bed such as a rotary kiln furnace or a conical kiln furnace, that with a continuous fixed bed such as a roller hearth furnace or a pusher furnace, or that with a batch fixed bed such as an atmosphere adjusting furnace. Alternatively, the firing techniques may involve use of pyrolysis furnaces utilizing a spraying or atomizing method.

The firing temperature in the above firing process cannot be determined by a uniform rule because the temperature is affected by conditions such as amounts of the aluminum-containing compound, coordinatable oxygen-containing organic compound, and dispersant used, but typically it is set in the range of 150° C. to 1000° C. An excessively low firing temperature is not preferable because the coordinatable oxygen-containing organic compounds will not decompose at such temperature, and an excessively high firing temperature is not preferable because the energy consumption will increase at such temperature. Accordingly, the firing temperature preferably is in the range of 200° C. to 900° C., and more preferably, in the range of 200° C. to 850° C.

The rate of temperature increase is not particularly limited, but an excessively fast temperature increase will necessitate use of a special firing furnace and result in a heavy burden of facilities. Thus, the rate of temperature increase is normally in the range of 1° C. to 80° C. per minute, and preferably, in the range of 2° C. to 50° C. per minute.

The period of retention time at a firing temperature cannot be determined by a uniform rule because it is affected by conditions such as amounts of the oxygen-containing organic compound and dispersant used, but typically it is set in the range of 0 to 180 minutes. An excessively short retention time is not preferable because it is unlikely to cause sufficient heat conduction for achieving homogeneity, and an excessively long retention time is not preferable because it causes carbon deficiency. Accordingly, the retention time preferably is in the range of 1 to 150 minutes, and more preferably, in the range of 5 to 120 minutes.

Warming and firing are performed in the presence of oxygen (as in air). When lowering the temperature, the atmosphere can be switched to an inert atmosphere in order to inhibit excessive oxidation. These operations can be conducted in a gas current or in a sealed atmosphere.

The rate of temperature decrease is not particularly limited, but an excessively fast temperature decrease will necessitate use of a special firing furnace and result in a heavy burden of facilities. Thus, the rate of temperature decrease is typically in the range of 1° C. to 80° C. per minute, and preferably, in the range of 2° C. to 50° C. per minute.

The atmosphere used during the temperature decrease is not particularly limited, and the temperature can be lowered in an atmosphere of inert gas such as nitrogen or argon, or in the presence of oxygen. The temperature is preferably lowered in an inert gas in view of safety and other considerations. Since moisture will be deposited on the surface of the target phosphor when the temperature is 300° C. or lower, the temperature is preferably lowered in a dry atmosphere.

The fired product obtained by the above firing process is ground and mixed to prevent aggregation and to reduce or eliminate the maldistribution of the respective components. A dispersant can be again added during the grinding/mixing. The grinding and mixing process is not particularly limited, and a process for mixing solids involves use of a ball mill, turbo mill, or jet mill, or alternatively use of a tool like a mortar.

The ground product obtained by the above grinding and mixing process may be fired multiple times. More specifically, firing may be performed not one time but multiple times by repeating the sequence of firing, cooling and crushing. Repeating the sequence of firing, cooling and crushing multiple times is advantageous in that it can readily provides an aluminum oxide phosphor with low maldistribution of respective components and a homogenous property.

The firing temperature used when multiple firing steps are repeated cannot be determined by a uniform rule because it is affected by conditions such as the amounts of aluminum-containing compound, coordinatable oxygen-containing organic compound and dispersant that were used, but it is typically in the range of 200° C. to 1000° C. An excessively low firing temperature is not preferable because it leads to insufficient firing of carbon, and thereby increases the amount of remnants and decreases the emission efficiency; an excessively high firing temperature is not preferable because carbon is completely burned out at such a high temperature to provide a deficiency of carbon as well as a change in the emission color. Hence, the firing temperature is preferably in the range of 300° C. to 900° C. and more preferably in the range of 500° C. to 900° C.

The resulting aluminum oxide phosphor can be obtained as a dry material after the temperature decreases, and it can be used in the obtained particle size. In addition, the obtained aluminum oxide phosphor may be further subjected to processes such as grinding and classifying prior to use so that it has a desired particle size.

The Examples of the present invention is explained below. In the respective Examples, aluminum oxide phosphors of different compositions were prepared, and the resulting aluminum oxide phosphors were subjected to an X-ray diffraction (XRD) analysis, a measurement for emission spectra under ultraviolet excitation by a 365 nm wavelength UV ray, a measurement for external quantum efficiency, an observation using a transmission electron microscope and an EFTEM analysis. The XRD analysis was conducted using a Rint 2200V X-ray diffractometer (manufactured by Rigaku Co.). The measurement for emission spectra under ultraviolet excitation by a 365 nm wavelength UV ray was conducted using the RF-5300PC spectrometer (manufactured by Shimadzu Co.). The measurement for external quantum efficiency was conducted using the C9920-02 measurement system (manufactured by Hamamatsu Photonics K.K.). The observations using the transmission electron microscope and the EFTEM analysis were conducted using HRTEM HF2100 transmission electron microscope (manufactured by Hitachi, Ltd.). The following examples are not intended to limit the scope of the present invention.

Example 1

Figure 2:
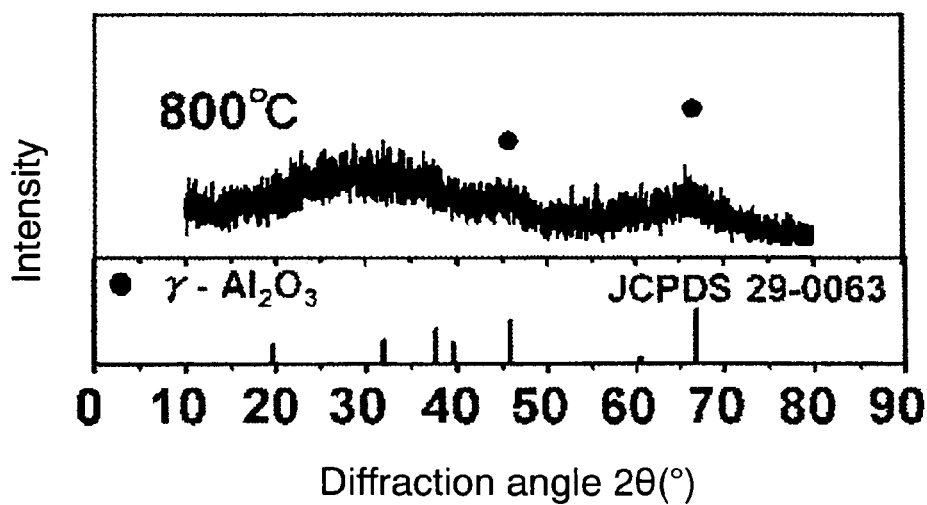
FIG. 2 is a graph showing the XRD test result for a phosphor according to an embodiment in the present invention.

In a 300 ml beaker, 7.92 g (0.024 mol) of aluminum nitrate hexahydrate and 15.0 g (0.25 mol) of urea (($NH_2$)$_2$CO) were introduced, and 33.3 g of superpure water was added thereto; then, the mixture was stirred using a hot plate stirrer (30° C., rotation: 500 rpm) until it dissolved in water. To the solution, 0.5 g of polyethylene glycol (PEG) (molecular mass: 20,000, commercially available from Wako Pure Chemical Industries Ltd.) was added, and the solution was stirred again at 30° C. and a rotation of 500 rpm using a hot plate stirrer. The resulting solution was transferred into a crucible and fired in a heating furnace. The rate of temperature increase was 20° C./min, and the firing was performed at 800° C. for 30 minutes. The results of the measurement for an emission spectrum under ultraviolet excitation by a 365 nm wavelength UV ray are shown in FIG. 1. The results of the measurement for external quantum efficiency are shown in Table 1. The results of the XRD analysis are shown in FIG. 2. The results of the EFTEM elemental analysis are shown in Table 2.

Example 2

The experiment was conducted in a manner similar to that of Example 1, except that 1.0 g of PEG (molecular mass: 20,000) was used. The results of the measurement for an emission spectrum under ultraviolet excitation by a 365 nm wavelength UV ray are shown in FIG. 1. The results of the measurement for external quantum efficiency are shown in Table 1. The results of the EFTEM elemental analysis are shown in Table 2.

Example 3

The experiment was conducted in a similar to that of Example 1, except that 2.0 g of PEG (molecular mass: 20,000) was used. The results of the measurement for an emission spectrum under ultraviolet excitation by a 365 nm wavelength UV ray are shown in FIG. 1. The results of the measurement for external quantum efficiency are shown in Table 1. The results of the EFTEM elemental analysis are shown in Table 2.

Example 4

The experiment was conducted in a manner similar to that of Example 1, except that 3.0 g of PEG (molecular mass: 20,000) was used. The results of the measurement for an emission spectrum under ultraviolet excitation by a 365 nm wavelength UV ray are shown in FIG. 1. The results of the measurement for external quantum efficiency are shown in Table 1. The results of the EFTEM elemental analysis are shown in Table 2.

Example 5

The experiment was conducted in a manner similar to that of Example 1, except that 5.0 g of PEG (molecular mass: 20,000) was used. The results of the measurement for an emission spectrum under ultraviolet excitation by a 365 nm wavelength UV ray are shown in FIG. 1. The results of the measurement for external quantum efficiency are shown in Table 1. The results of the EFTEM elemental analysis are shown in Table 2.

Example 6

Figure 3:
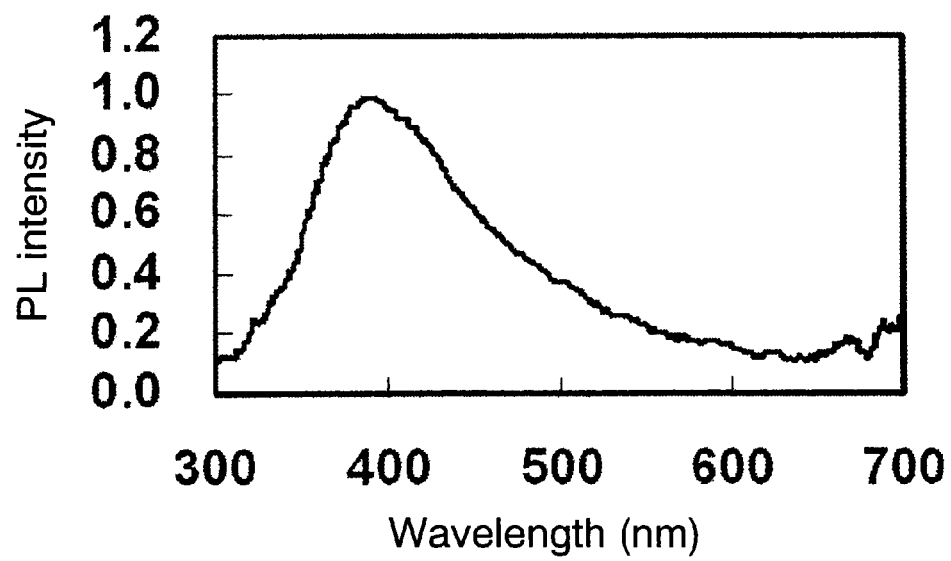
FIG. 3 is a graph showing the emission spectrum under ultraviolet excitation of a phosphor according to an embodiment in the present invention.

In a motor, 2.0 g (0.006 mol) of aluminum chloride hexahydrate, 2.5 g of urea (0.04 mol), and 1.0 g of PEG (molecular mass: 20,000) were mixed and kneaded, and the mixture was transferred into a crucible and fired at 400° C. for an hour in an nitrogen atmosphere. Then it was cooled to room temperature and crushed and ground in a mortar. The mixture was further put in the crucible and fired at 800° C. for an hour. The results of the measurement for an emission spectrum under ultraviolet excitation by a 365 nm wavelength UV ray are shown in FIG. 3. The results of the measurement for external quantum efficiency are shown in Table 1. The results of the EFTEM elemental analysis are shown in Table 2.

Example 7

Figure 4:
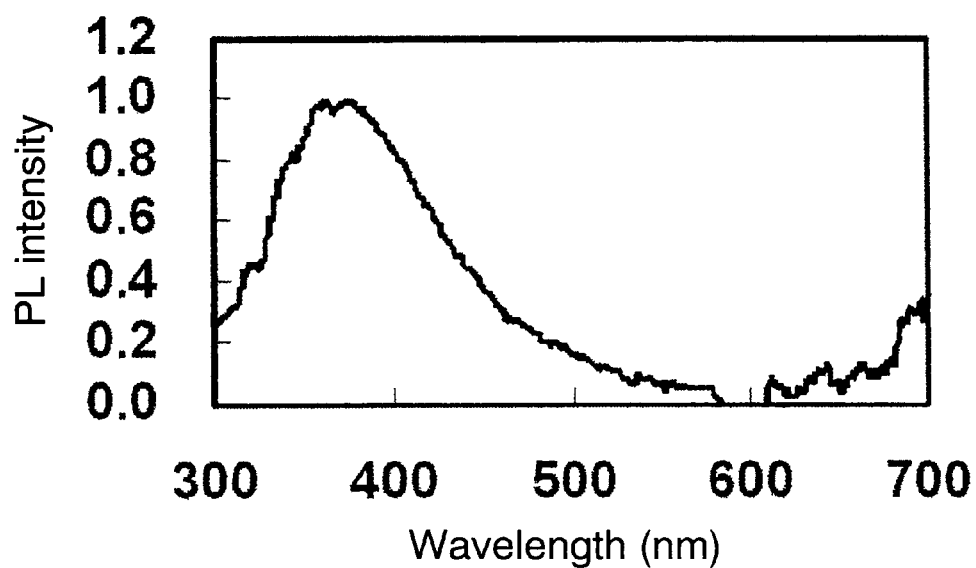
FIG. 4 is a graph showing the emission spectrum under ultraviolet excitation of a phosphor according to an embodiment in the present invention.

The experiment was conducted in a manner similar to that of Example 6, except that 1.0 g of tetraethylene glycol was used in place of PEG. The results of the measurement for an emission spectrum under ultraviolet excitation by a 365 nm wavelength UV ray are shown in FIG. 4. The results of the measurement test for external quantum efficiency are shown in Table 1. The results of the EFTEM elemental analysis are shown in Table 2.

Example 8

Figure 5:
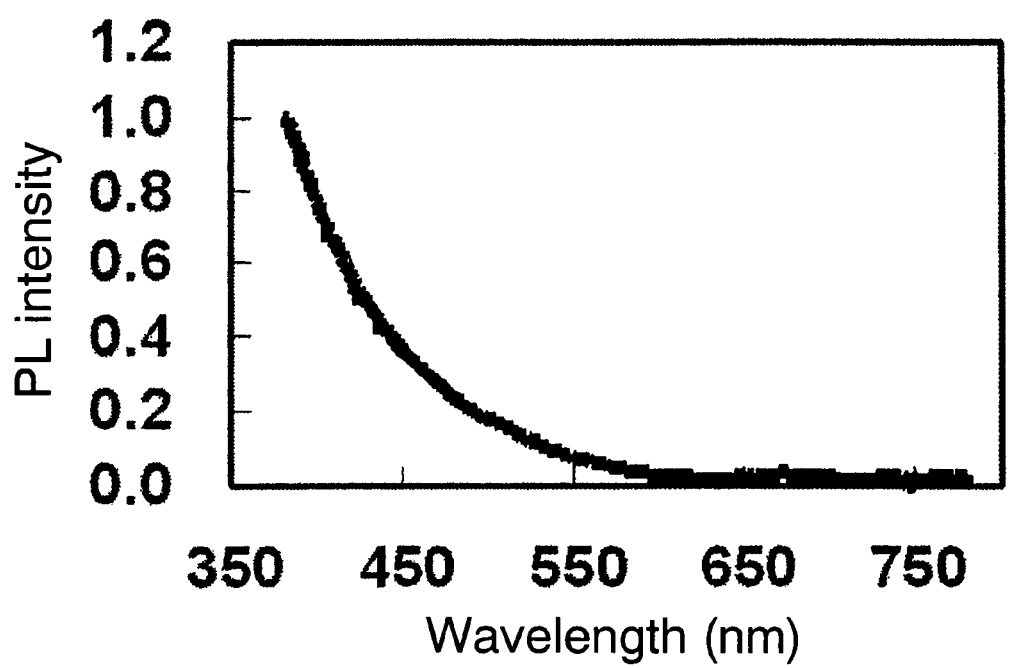
FIG. 5 is a graph showing the emission spectrum under ultraviolet excitation of a phosphor according to an embodiment in the present invention.

The experiment was conducted in a manner similar to that of Example 6, except that no urea was added. The results of the measurement for an emission spectrum under ultraviolet excitation by a 365 nm wavelength UV ray are shown in FIG. 5. The results of the measurement for external quantum efficiency are shown in Table 1. The results of the EFTEM elemental analysis are shown in Table 2.

TABLE 1

| | Example 1 | Example 2 | Example 3 | Example 4 | Example 5 | Example 6 | Example 7 | Example 8 |
|---|---|---|---|---|---|---|---|---|
| External Quantum Efficiency % | 2 | 18 | 22 | 36 | 31 | 16 | 15 | 11 |

TABLE 2

|         | Example 1 | Example 2 | Example 3 | Example 4 | Example 5 | Example 6 | Example 7 | Example 8 |
|---------|-----------|-----------|-----------|-----------|-----------|-----------|-----------|-----------|
| Al mol %| 38.4      | 38.0      | 37.5      | 40.6      | 36.9      | 40.7      | 41.3      | 44.1      |
| O mol % | 60.9      | 60.8      | 59.3      | 55.1      | 59.3      | 57.8      | 57.0      | 54.7      |
| C mol % | 0.7       | 1.2       | 3.2       | 4.3       | 3.8       | 1.5       | 1.7       | 1.1       |
| N mol % | —         | —         | —         | —         | —         | —         | —         | —         |

According to the above Examples 1 to 4, the peak PL intensity increases with the amount of PEG added, as seen from the result of measurement tests for emission spectra shown in FIG. 1. Further, it is shown that the external quantum efficiency increases with the amount of PEG added as shown in Table 1, and the carbon content in the aluminum oxide phosphor of this invention increases with the amount of PEG added.

Further, it can be seen from Table 2 and FIG. 2 that the aluminum oxide phosphor is an Al—C—O based compound showing a γ-$Al_2O_3$ structure. It can be seen from FIG. 1, and FIGS. 3 to 5 that the wavelength showing the peak PL intensity differs according to the composition of the Al—C—O based compound.

INDUSTRIAL APPLICABILITY

An aluminum oxide phosphor can be obtained by the production method according to the present invention wherein the wavelength of an emission spectrum can be changed within the range of 350 nm (falling in the ultraviolet range) to 480 nm (corresponding to a green light), and the method is industrially useful.

The invention claimed is:

1. An ultraviolet excitation type aluminum oxide phosphor consisting essentially of aluminum (Al), carbon (C), and oxygen (O), wherein aluminum (Al), carbon (C), oxygen (O) are respectively contained in an amount of:
   30 mol %<Al<60 mol %,
   1 mol %<C<10 mol %, and
   30 mol %<O<70 mol %,
   wherein Al+C+O=100 mol %, and
   wherein the aluminum oxide phosphor comprises a γ-$Al_2O_3$ structure.

2. A production method for producing the ultraviolet excitation type aluminum oxide phosphor according to claim 1, comprising:
   mixing an aluminum-containing compound with a coordinatable oxygen-containing organic compound serving as an oxygen-source and a carbon-source; and
   firing the resultant mixture of the aluminum-containing compound and the coordinatable oxygen-containing compound in a presence of oxygen to form the aluminum oxide phosphor.

3. An ultraviolet excitation type aluminum oxide phosphor consisting essentially of aluminum (Al), carbon (C), and oxygen (O), wherein aluminum (Al), carbon (C), oxygen (O) are respectively contained in an amount of:
   Al: 34 mol % to 53 mol %,
   C, 1 mol % to 7 mol %, and
   O: 45 mol % to 65 mol %,
   wherein Al+C+O=100 mol %, and
   wherein the aluminum oxide phosphor comprises a γ-$Al_2O_3$ structure.

4. The ultraviolet excitation type aluminum oxide phosphor of claim 1, wherein the wavelength of the emission spectrum of the phosphor is variable in the range between 350 nm (falling in the ultraviolet range) and 480 nm (corresponding to a green light) without changing the basic composition of the phosphor.

5. The ultraviolet excitation type aluminum oxide phosphor of claim 3, wherein the wavelength of the emission spectrum of the phosphor is variable in the range between 350 nm (falling in the ultraviolet range) and 480 nm (corresponding to a green light) without changing the basic composition of the phosphor.

* * * * *